United States Patent
Kakemizu et al.

(10) Patent No.: US 9,400,379 B2
(45) Date of Patent: Jul. 26, 2016

(54) MAGNIFYING OBSERVATION APPARATUS, AND IMAGE DISPLAY METHOD AND MICROSCOPY SWITCHING METHOD THEREOF

(75) Inventors: Takahiko Kakemizu, Tokyo (JP); Yosuke Tani, Tokyo (JP); Shodai Hosono, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 598 days.

(21) Appl. No.: 13/609,917

(22) Filed: Sep. 11, 2012

(65) Prior Publication Data

US 2013/0070075 A1    Mar. 21, 2013

(30) Foreign Application Priority Data

Sep. 21, 2011  (JP) ................................. 2011-206333

(51) Int. Cl.
G02B 21/36 (2006.01)
G02B 21/00 (2006.01)
H04N 7/18 (2006.01)

(52) U.S. Cl.
CPC ................ *G02B 21/365* (2013.01); *H04N 7/18* (2013.01)

(58) Field of Classification Search
CPC .................................................. G02B 21/365
USPC ................... 348/79, 135, 344; 359/368, 380; 382/128, 254
See application file for complete search history.

(56) References Cited

U.S. PATENT DOCUMENTS

| 7,560,675 | B2 * | 7/2009 | Takahashi | G02B 21/365 250/201.3 |
| 7,848,636 | B2 * | 12/2010 | Uchida | 396/432 |
| 8,102,418 | B2 * | 1/2012 | Kojima | 348/80 |
| 8,106,943 | B2 * | 1/2012 | Ishii | G02B 21/365 348/135 |
| 8,284,246 | B2 * | 10/2012 | Shirota | G02B 21/365 348/345 |
| 8,587,670 | B2 * | 11/2013 | Wood et al. | 348/207.99 |
| 8,618,479 | B2 * | 12/2013 | Kashihara | 250/311 |
| 2003/0058530 | A1 * | 3/2003 | Kawano | 359/385 |
| 2004/0085652 | A1 * | 5/2004 | Inomata | 359/802 |
| 2005/0145792 | A1 * | 7/2005 | Nakazawa et al. | 250/311 |
| 2006/0176367 | A1 | 8/2006 | Endo et al. | |

(Continued)

FOREIGN PATENT DOCUMENTS

| JP | 2004-153462 A | 5/2004 |
| JP | 2004153462 A * | 5/2004 |

(Continued)

OTHER PUBLICATIONS

Japanese Office Action (and English translation thereof) dated Apr. 28, 2015, issued in counterpart Japanese Application No. 2011-206333.

*Primary Examiner* — Christopher S Kelley
*Assistant Examiner* — Kathleen Walsh
(74) *Attorney, Agent, or Firm* — Holtz, Holtz & Volek PC

(57) ABSTRACT

A magnifying observation apparatus includes a switching unit for switching between a plurality of microscopies, an image generating unit for generating an image of a sample by capturing an image of the sample with the respective plurality of microscopies switched by the switching unit, and a display unit for displaying the image generated by the image generating unit. The display unit updates a display of the display unit each time a new image is generated by the image generating unit.

17 Claims, 16 Drawing Sheets

(56) References Cited

U.S. PATENT DOCUMENTS

| | | | |
|---|---|---|---|
| 2007/0081231 A1* | 4/2007 | Shirota | G02B 21/367 359/380 |
| 2007/0167842 A1* | 7/2007 | Tanikawa et al. | 600/476 |
| 2007/0257182 A1* | 11/2007 | Sawada et al. | 250/201.3 |
| 2007/0285768 A1* | 12/2007 | Kawanabe et al. | 359/372 |
| 2007/0285769 A1* | 12/2007 | Shirota et al. | 359/380 |
| 2008/0043469 A1* | 2/2008 | Watanabe et al. | 362/257 |
| 2008/0144170 A1* | 6/2008 | Takahashi | 359/388 |
| 2008/0266656 A1* | 10/2008 | Sander | G02B 21/0012 359/372 |
| 2008/0282197 A1* | 11/2008 | Yumoto | G02B 21/365 715/838 |
| 2008/0304147 A1* | 12/2008 | Kawanabe et al. | 359/388 |
| 2009/0185035 A1* | 7/2009 | Shirota | G02B 21/365 348/79 |
| 2009/0213214 A1* | 8/2009 | Yamada | G01N 21/6458 348/80 |
| 2009/0296203 A1* | 12/2009 | Kojima | 359/363 |
| 2010/0265323 A1* | 10/2010 | Perz | 348/79 |
| 2011/0216183 A1* | 9/2011 | Yokomachi | 348/79 |
| 2011/0221881 A1* | 9/2011 | Shirota et al. | 348/79 |
| 2011/0267449 A1* | 11/2011 | Shirota et al. | 348/79 |
| 2012/0044342 A1* | 2/2012 | Hing | G02B 21/361 348/79 |
| 2012/0050850 A1* | 3/2012 | Yamamoto et al. | 359/372 |

FOREIGN PATENT DOCUMENTS

| | | | |
|---|---|---|---|
| JP | 2006-030969 A | | 2/2006 |
| JP | 2006030969 A | * | 2/2006 |
| JP | 2006220904 A | | 8/2006 |
| JP | 2006323075 A | | 11/2006 |
| JP | 2007-178661 A | | 7/2007 |
| JP | 2007178661 A | * | 7/2007 |
| JP | 2008058396 A | | 3/2008 |
| JP | 2010085463 A | * | 4/2010 |

* cited by examiner

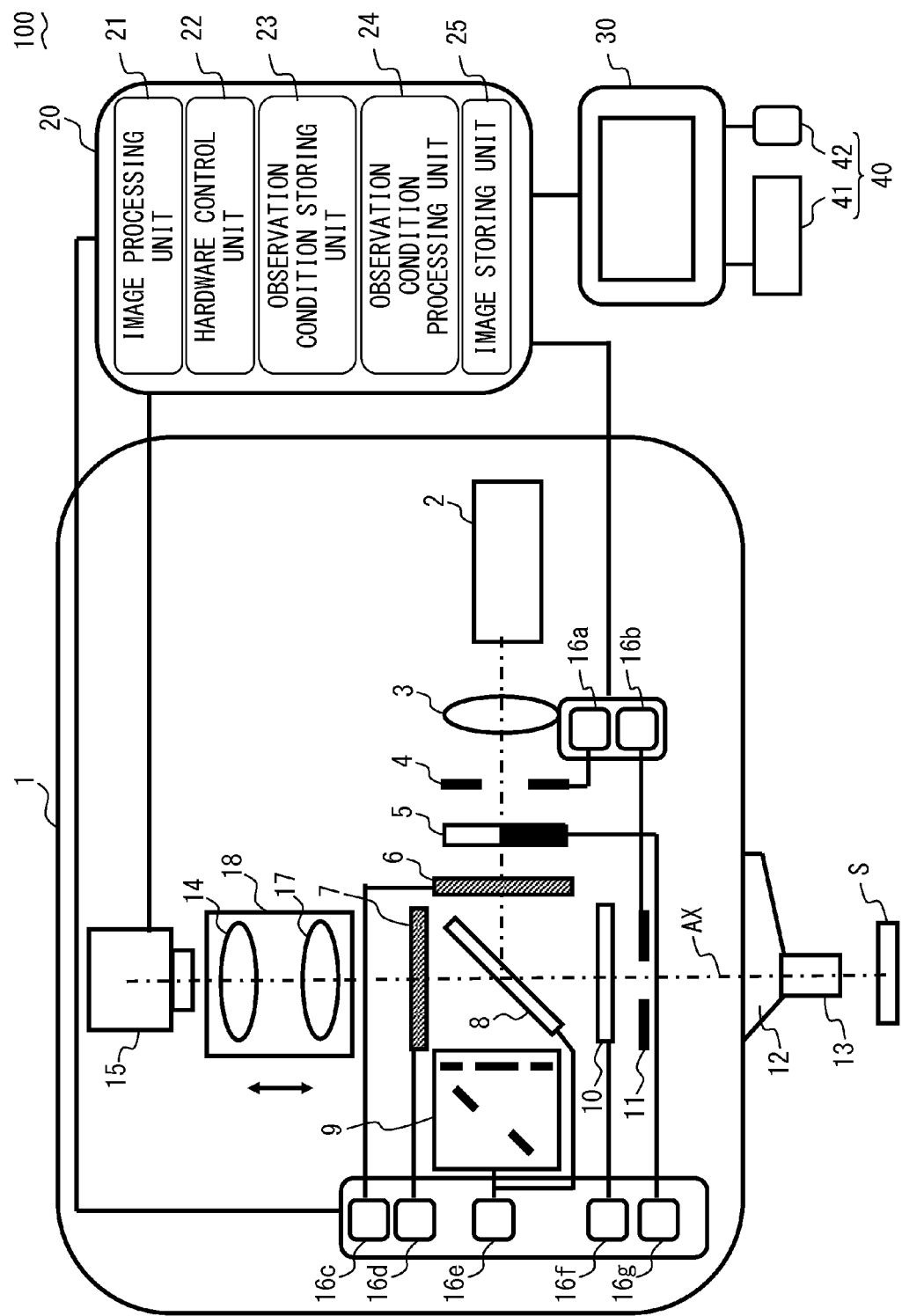
F I G. 1

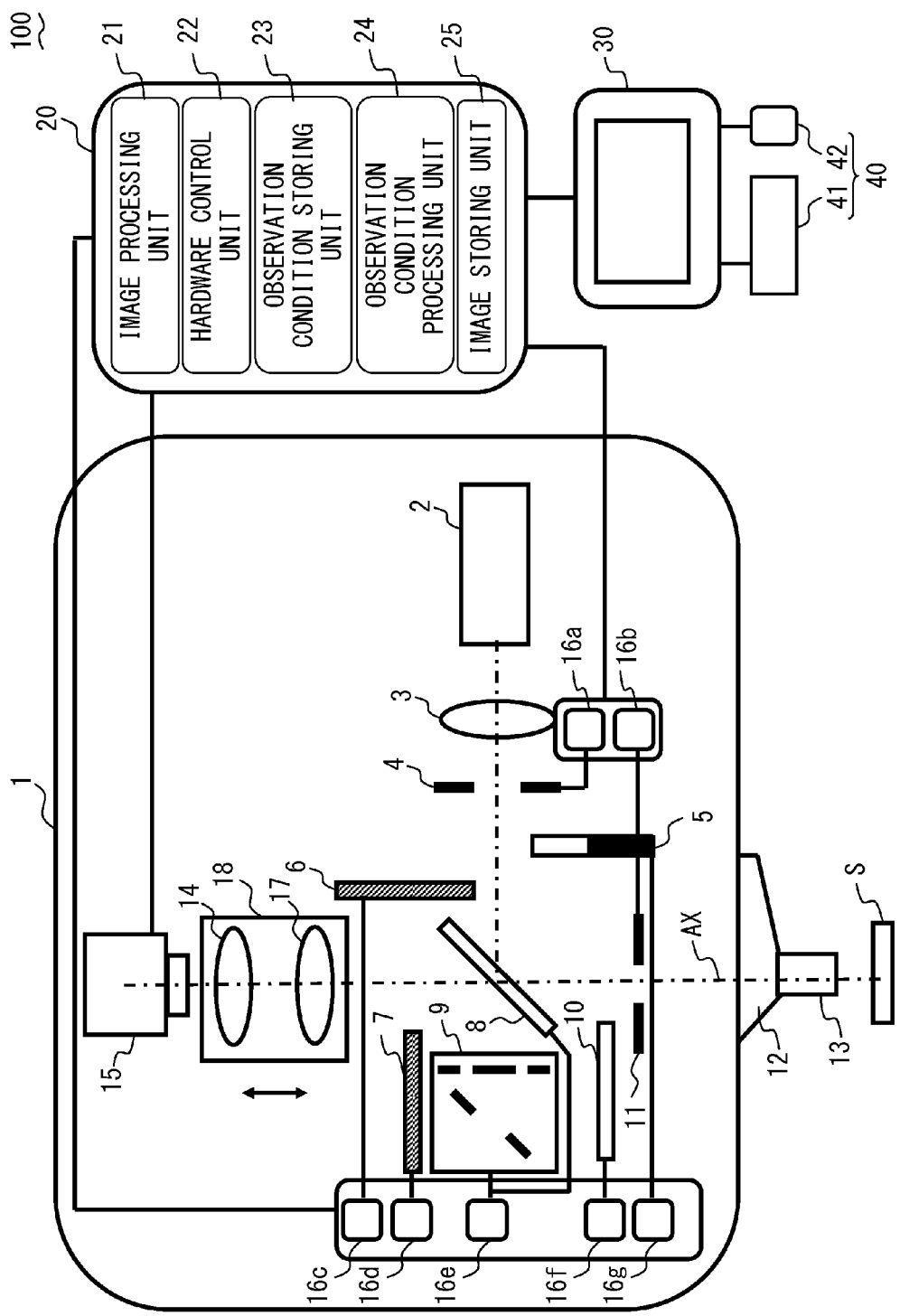
F I G. 2

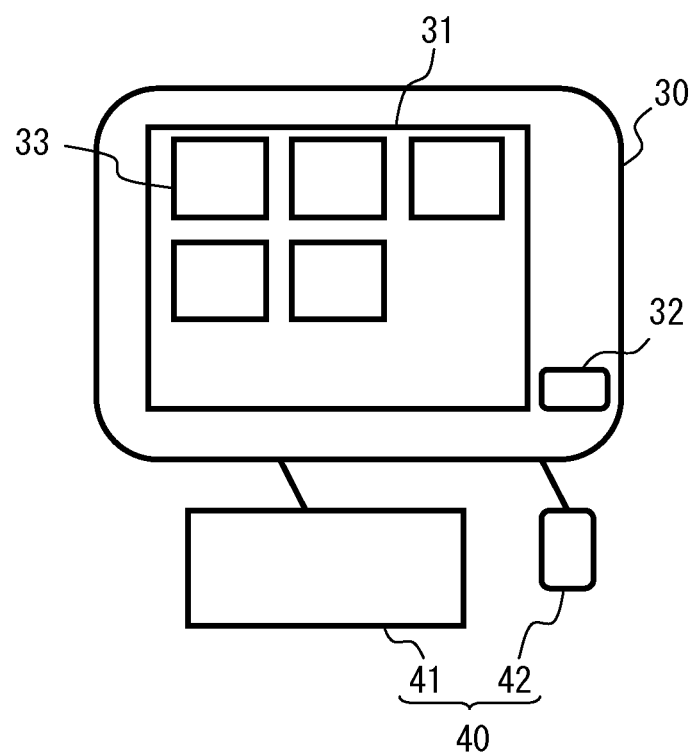
F I G. 7

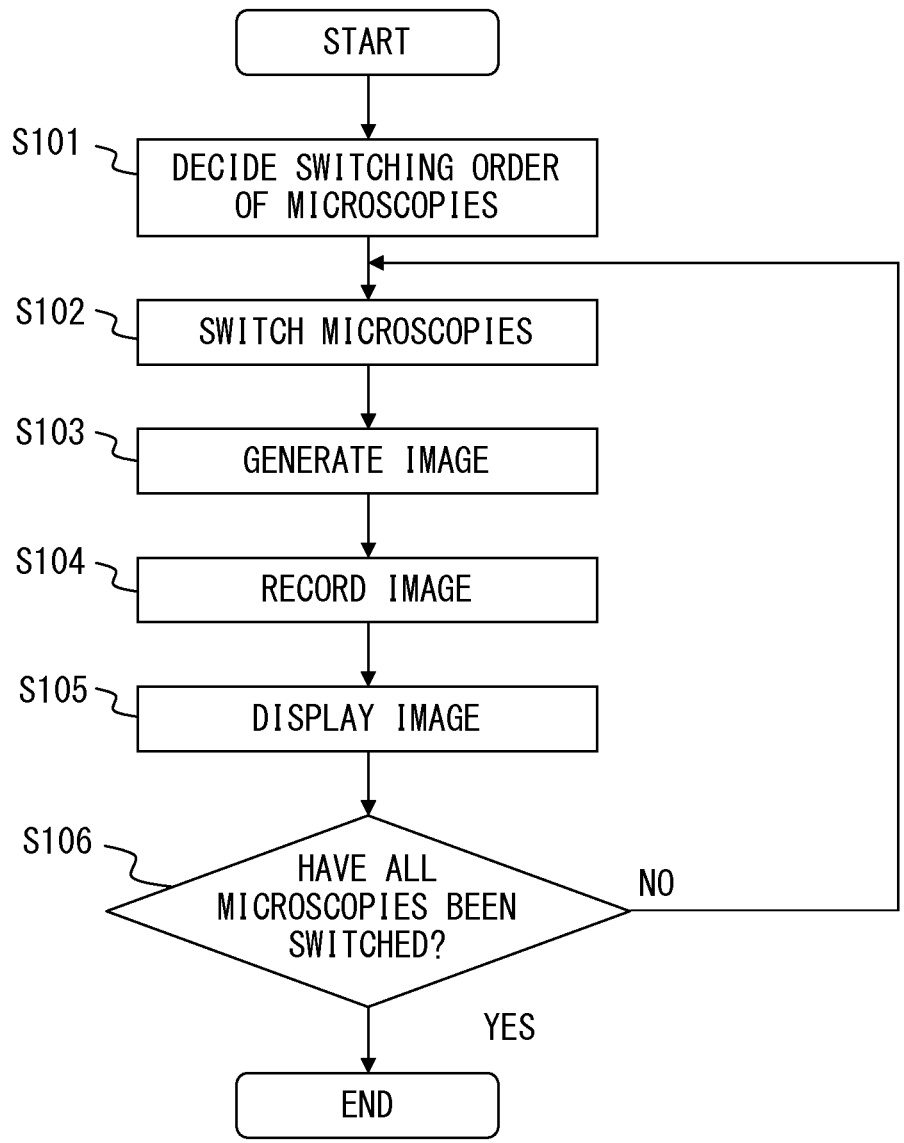
F I G. 8

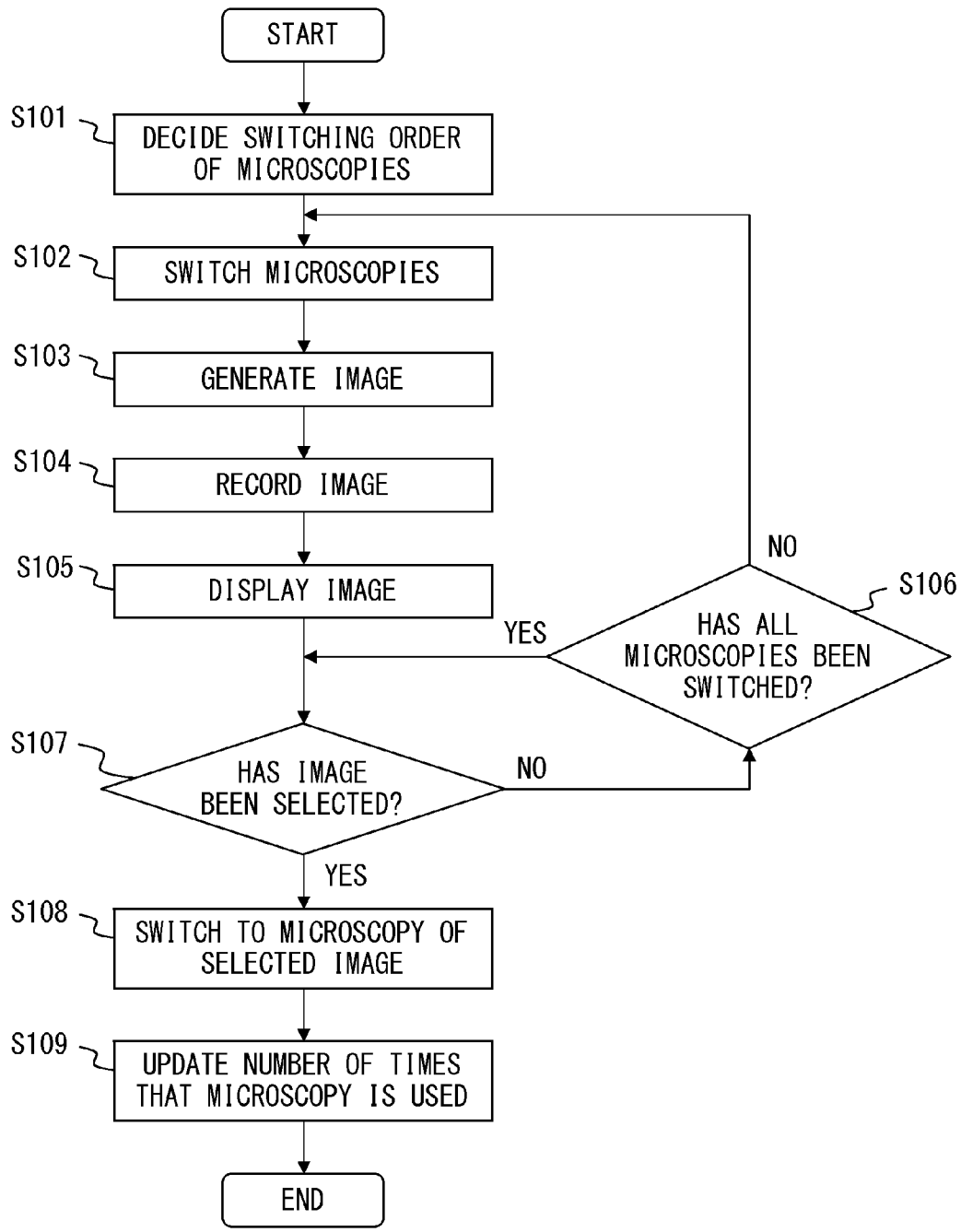
F I G. 1 2

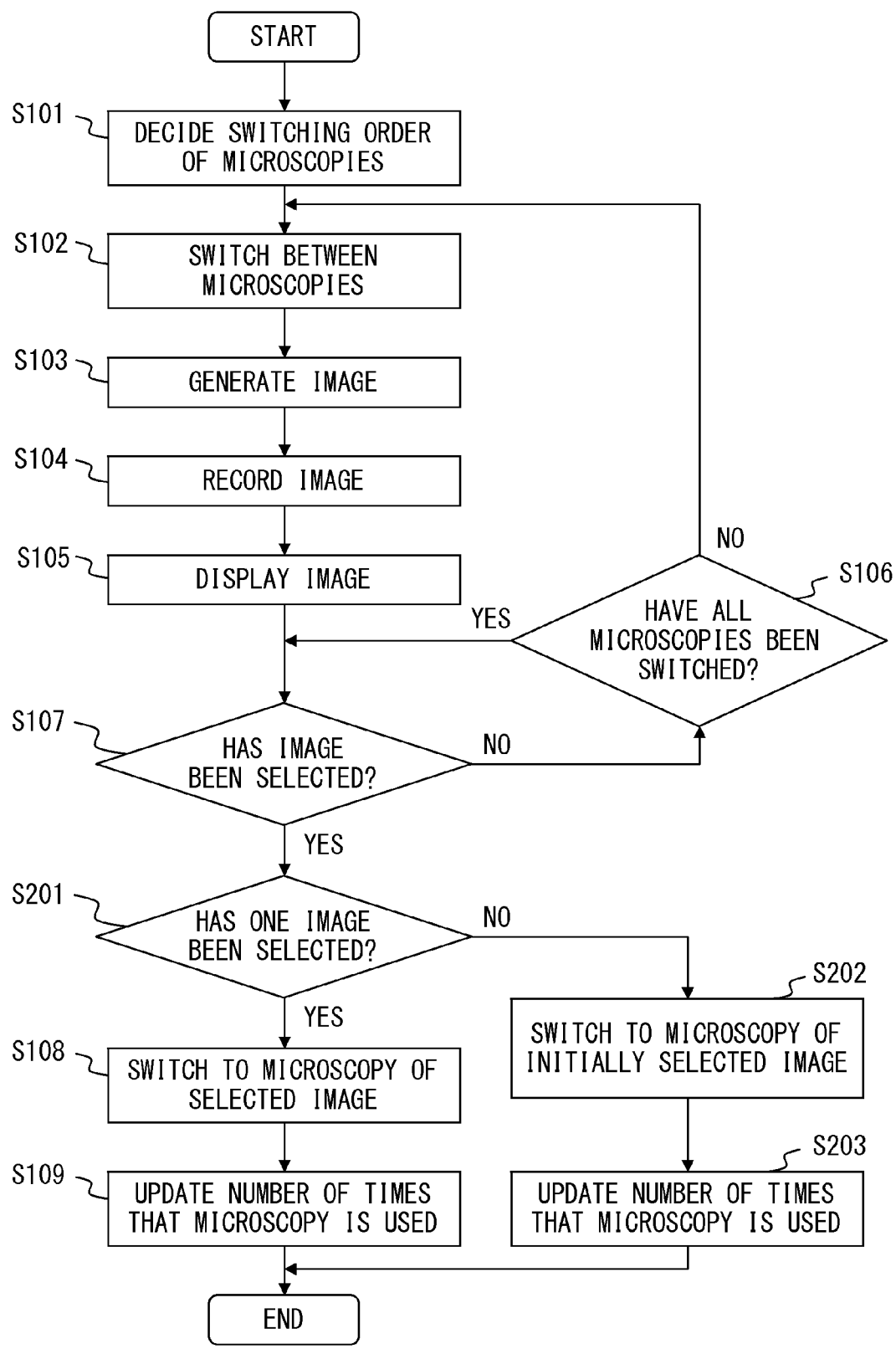
F I G. 1 3

MAGNIFYING OBSERVATION APPARATUS, AND IMAGE DISPLAY METHOD AND MICROSCOPY SWITCHING METHOD THEREOF

CROSS-REFERENCE TO RELATED APPLICATIONS

This application is based upon and claims the benefit of priority of the prior Japanese Patent Application No. 2011-206333, filed on Sep. 21, 2011, the entire contents of which are incorporated herein by reference.

BACKGROUND OF THE INVENTION

1. Field of the Invention

The present invention relates to a technique of a magnifying observation apparatus for observing a sample by magnifying and displaying the sample, and to an image display method and a microscopy switching method of the magnifying observation apparatus, and more particularly to a technique of a magnifying observation apparatus that supports various microscopies, a display method of images that the magnifying observation apparatus obtains with various microscopies, and a microscopy switching method.

2. Description of the Related Art

With magnifying observation apparatuses such as a microscope, a digital microscope and the like, a desired image of a sample can be obtained by optimally adjusting observation conditions such as a microscopy, an illumination condition, and the like in advance.

However, setting operations for optimally adjusting the observation conditions are very laborious operations that are performed by trial and error and need advanced expertise. For this reason, it is difficult for inexperienced users such as a novice and the like to optimally adjust the observation conditions. Moreover, the setting operations for optimally adjusting the observation conditions are very burdensome even for experts.

A technique related to such a problem is disclosed, for example, by Japanese Laid-Open Patent Publication No. 2007-178661. Japanese Laid-Open Patent Publication No. 2007-178661 discloses the technique of automatically changing a setting of an aperture diameter of an aperture stop unit by selecting a mirror unit corresponding to a desired microscopy from among a plurality of mirror units corresponding to different microscopies, and by placing the selected mirror unit on an optical axis.

According to the technique disclosed by Japanese Laid-Open Patent Publication No. 2007-178661, a user can obtain a more satisfactory image with a selected microscopy by selecting the microscopy.

With the technique disclosed by Japanese Laid-Open Patent Publication No. 2007-178661, the setting of the aperture diameter of the aperture stop unit is automatically changed by selecting a mirror unit according to a microscopy. Therefore, even with the technique disclosed by Japanese Laid-Open Patent Publication No. 2007-178661, a user himself or herself selects an optimal microscopy.

SUMMARY OF THE INVENTION

A first aspect of the present invention provides a magnifying observation apparatus including: a switching unit for switching between a plurality of microscopies; an image generating unit for generating an image of a sample by capturing an image of the sample with the respective plurality of microscopies switched by the switching unit; and a display unit for displaying the image generated by the image generating unit. The display unit updates a display of the display unit each time a new image is generated by the image generating unit.

Another aspect of the present invention provides an image display method of a magnifying observation apparatus including: a first switching step of switching between a plurality of microscopies; an image generating step of generating an image of a sample by capturing an image of the sample with the respective plurality of microscopies switched by the first switching step; and a displaying step of displaying a generated image each time the image is generated by the image generating step.

A further aspect of the present invention provides a microscopy switching method of a magnifying observation apparatus including: a switching order deciding step of deciding a switching order for switching between a plurality of microscopies; a first switching step of switching between the plurality of microscopies in the switching order decided by the switching order deciding step; an image generating step of generating an image of a sample by capturing an image of the sample with the respective plurality of microscopies switched by the first switching step; a displaying step of displaying a generated image each time the image is generated by the image generating step; an image selecting step of causing a user to select a selected image from among images displayed by the displaying step; and a second switching step of stopping switching between the microscopies sequentially in the switching order decided by the switching order deciding step, and switching to a microscopy used when the selected image selected by the image selecting step is generated, when the selected image is selected by the image selecting step.

BRIEF DESCRIPTION OF THE DRAWINGS

The present invention will be more apparent from the following detailed description when the accompanying drawings are referenced.

FIG. 1 illustrates a configuration of a magnifying observation apparatus according to a first embodiment;

FIG. 2 illustrates a placement of optical elements included in the magnifying observation apparatus illustrated in FIG. 1 for a brightfield observation;

FIG. 7 is an explanatory view of an image display method of the magnifying observation apparatus according to the first embodiment;

FIG. 8 is a flowchart illustrating a process executed by the magnifying observation apparatus according to the first embodiment;

FIG. 12 is a flowchart illustrating a process executed in an observation condition setting mode of a magnifying observation apparatus according to a second embodiment;

FIG. 13 is a flowchart illustrating a process executed in an observation condition setting mode of a magnifying observation apparatus according to a third embodiment;

DESCRIPTION OF THE PREFERRED EMBODIMENTS

<First Embodiment>

Figure 3:
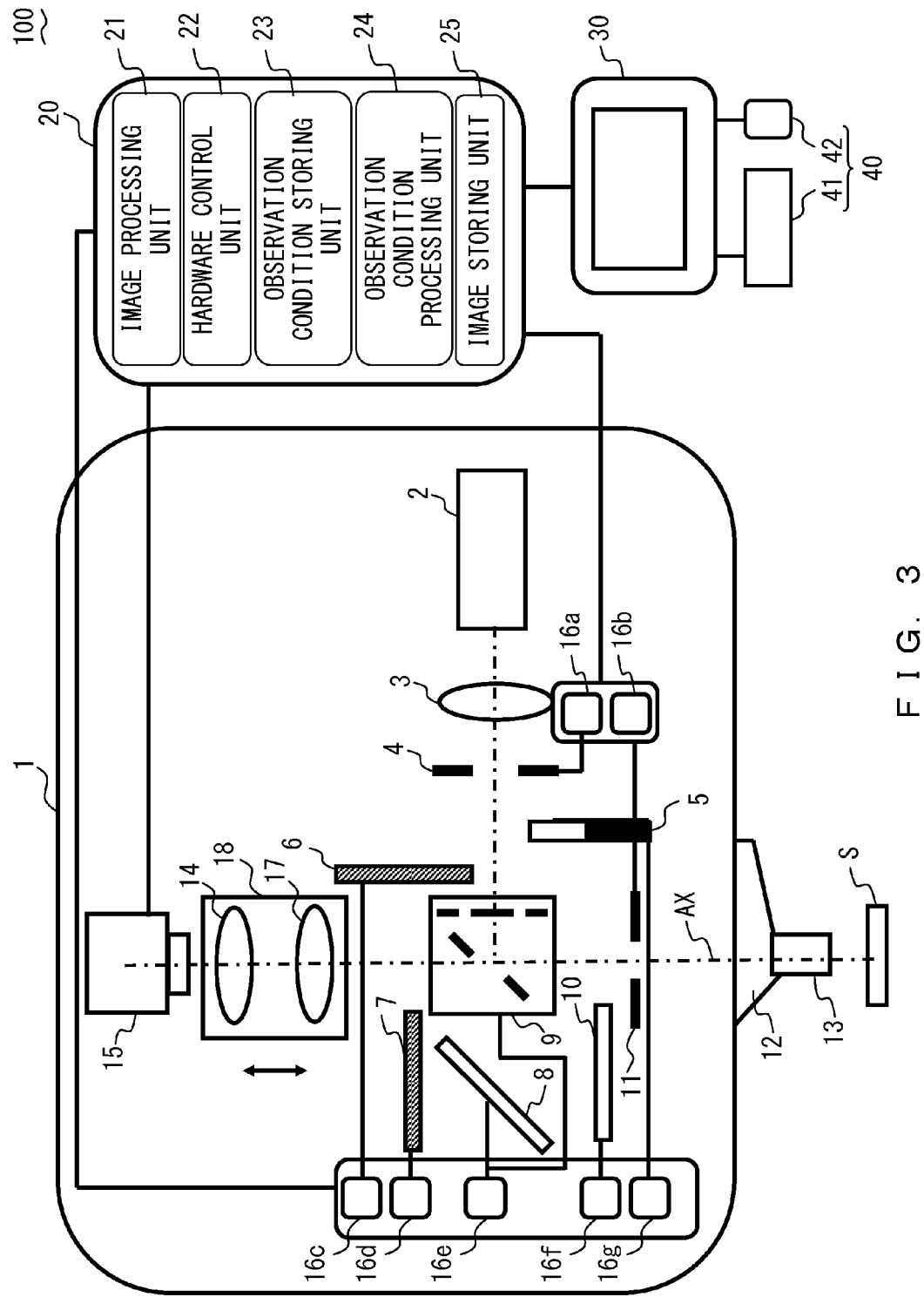
FIG. 3 illustrates a placement of the optical elements included in the magnifying observation apparatus illustrated in FIG. 1 for a darkfield observation.

FIG. 1 illustrates a configuration of a magnifying observation apparatus according to a first embodiment. The magnifying observation apparatus 100 illustrated in FIG. 1 is a magnifying observation apparatus that enables a user to determine an optimal microscopy and optimal observation conditions by displaying images of a sample captured with a respective plurality of microscopies. The magnifying observation apparatus 100 includes a magnifying observation apparatus main body 1, a controller 20, a monitor 30, and an input device 40 including a keyboard 41 and a mouse 42.

The observation conditions mean all settings of the magnifying observation apparatus which are intended to obtain a desired image of a sample. Settings of a microscopy, components (such as a light source, optical elements, an image capturing element and the like) of the magnifying observation apparatus, their combination, and the like are observation conditions. Moreover, the observation conditions may include image processes.

The magnifying observation apparatus main body 1 includes a light source 2 for emitting illumination light, an illumination lens 3, a field stop 4 for adjusting an illumination range, an oblique observation slit 5 for shielding one half of a plane including an incident optical axis of an incident light flux, a polarizer 6, an analyzer 7, a half mirror 8, a darkfield cube 9 including a slit and a mirror with a hole, a DIC (Differential Interference Contrast) prism 10, an aperture stop 11 for adjusting an incidence angle of illumination light irradiated on a sample S, a nosepiece 12, an objective lens 13, a zoom mechanism 18 having a zoom image forming optical system composed of a zoom lens 17 and a tube lens 14, a CCD camera 15 for generating an image (original image) of the sample S by capturing the image of the sample S, and a plurality of driving control units (a diameter control unit 16a, a diameter control unit 16b, an insertion/removal control unit 16c, an insertion/removal control unit 16d, an insertion/removal control unit 16e, an insertion/removal control unit 16f, and an insertion/removal control unit 16g).

The light source 2 is, for example, a white LED light source. The polarizer 6 and the analyzer 7 are respectively a polarizing filter (polarizer), and are arranged to be rotatable about the incident optical axis. The DIC prism 10 is, for example, a Nomarski prism, and is placed to be adjustable in order to adjust retardation. The objective lens 13 is an objective lens that can observe both a bright field and a dark field. The zoom mechanism 18 is configured to continuously change a zoom magnification of the zoom image forming optical system by changing a distance between the zoom lens 17 and the tube lens 14.

The plurality of driving control units respectively control driving operations of the different optical elements of the magnifying observation apparatus 100. Specifically, of the driving control units, the diameter control unit 16a and the diameter control unit 16b respectively adjust an aperture diameter by driving the field stop 4 and the aperture stop 11. The insertion/removal control unit 16c, the insertion/removal control unit 16d, the insertion/removal control unit 16f, and the insertion/removal control unit 16g respectively drive the polarizer 6, the analyzer 7, the DIC prism 10, and the oblique observation slit 5 to insert/remove them in/from an optical path. The insertion/removal control unit 16e drives the half mirror 8 and the darkfield cube 9 to insert either of them in the optical path, and to remove the other from the optical path.

The controller 20 includes an image processing unit 21 for processing an image (original image) generated by the CCD camera 15, a hardware control unit 22 for controlling driving operations of the optical elements of the magnifying observation apparatus main body 1, an observation condition storing unit 23 for storing setting information such as a placement of the optical elements for each microscopy, and the number of times that each microscopy is used, an observation condition processing unit 24 for deciding a switching order for switching between a plurality of microscopies, and an image storing unit 25 for storing images of the sample S.

The hardware control unit 22 switches between the plurality of microscopies by controlling the driving operations of the optical elements of the magnifying observation apparatus main body 1 via the driving control units. The hardware control unit 22 may also perform a control for the CCD camera 15, such as adjustments of a gain and a shutter speed, and a control for the light source 2, such as an adjustment of its output.

Image processes executed by the image processing unit 21 include at least one of an HDR (High Dynamic Range) process, a halation removal process, a particular color enhancement process, and an edge enhancement process, which are executed for an original image generated by the CCD camera 15. Moreover, the image processing unit 21 converts an original image into a thumbnail image if needed.

The HDR process is an image process for enlarging a dynamic range by merging a plurality of images exposed for different durations. The halation removal process is an image process for reducing halation by exposing the sample S under a condition suitable for a bright portion, and by brightening a dark portion with an image process. The particular color enhancement process is an image process for displaying a particular color portion of an image in the color, and for displaying the rest of the image in black and white. The edge enhancement process is an image process for clearly displaying an edge portion by enhancing the edge portion of the sample S.

The plurality of microscopies switched and used by the magnifying observation apparatus 100 include at least one of a brightfield observation, a darkfield observation, a differential interference observation, a polarization observation, an oblique observation, and a fluorescent observation.

Placements of the optical elements included in the magnifying observation apparatus 100 respectively for the microscopies are described. FIGS. 2, 3, 4, 5 and 6 respectively illustrate the placements of the optical elements included in the magnifying observation apparatus 100 for the brightfield observation, the darkfield observation, the differential interference observation, the polarization observation, and the oblique observation.

Hereinafter, as states of the optical elements, a state where an optical element is inserted in the optical path is defined as an IN state, whereas a state where an optical element is removed from the optical path is defined as an OUT state. Moreover, of the field stop 4, the oblique observation slit 5, the polarizer 6, the analyzer 7, the half mirror 8, the darkfield cube 9, the DIC prism 10 and the aperture stop 11 (hereinafter referred to as movable members), which are respectively controlled by the plurality of driving control units, the oblique observation slit 5, the polarizer 6, the analyzer 7, the half mirror 8, the darkfield cube 9, and the DIC prism 10, which are controlled by the insertion/removal control units (the insertion/removal control unit 16c, the insertion/removal control unit 16d, the insertion/removal control unit 16e, the insertion/removal control unit 16f, and the insertion/removal control unit 16g), are generically referred to as insertion/removal members.

As illustrated in FIG. 2, in the magnifying observation apparatus 100 that executes a brightfield microscopy, namely, a brightfield observation, of the insertion/removal members only the half mirror 8 is in the IN state, and the other insertion/removable members are in the OUT state. Moreover, the field stop 4 and the aperture stop 11 are adjusted to be a diameter suitable for the observation. With the magnifying observation apparatus 100 illustrated in FIG. 2, illumination light is reflected by the half mirror 8 in the same direction (hereinafter referred to as a coaxial direction) as the optical axis AX of the objective lens 13. Therefore, coaxial episcopic illumination can be realized.

As illustrated in FIG. 3, in the magnifying observation apparatus 100 that executes a darkfield microscopy, namely, a darkfield observation, of the insertion/removal members only the darkfield cube 9 is in the IN state, and the other insertion/removal members are in the OUT state. Moreover, the field stop 4 and the aperture stop 11 are adjusted to be a diameter suitable for the observation. With the magnifying observation apparatus 100 illustrated in FIG. 3, illumination light is incident only to a peripheral portion of a pupil of the objective lens 13 and irradiated obliquely on the sample S. Therefore, only scattering light and diffracted light can be detected.

Figure 4:
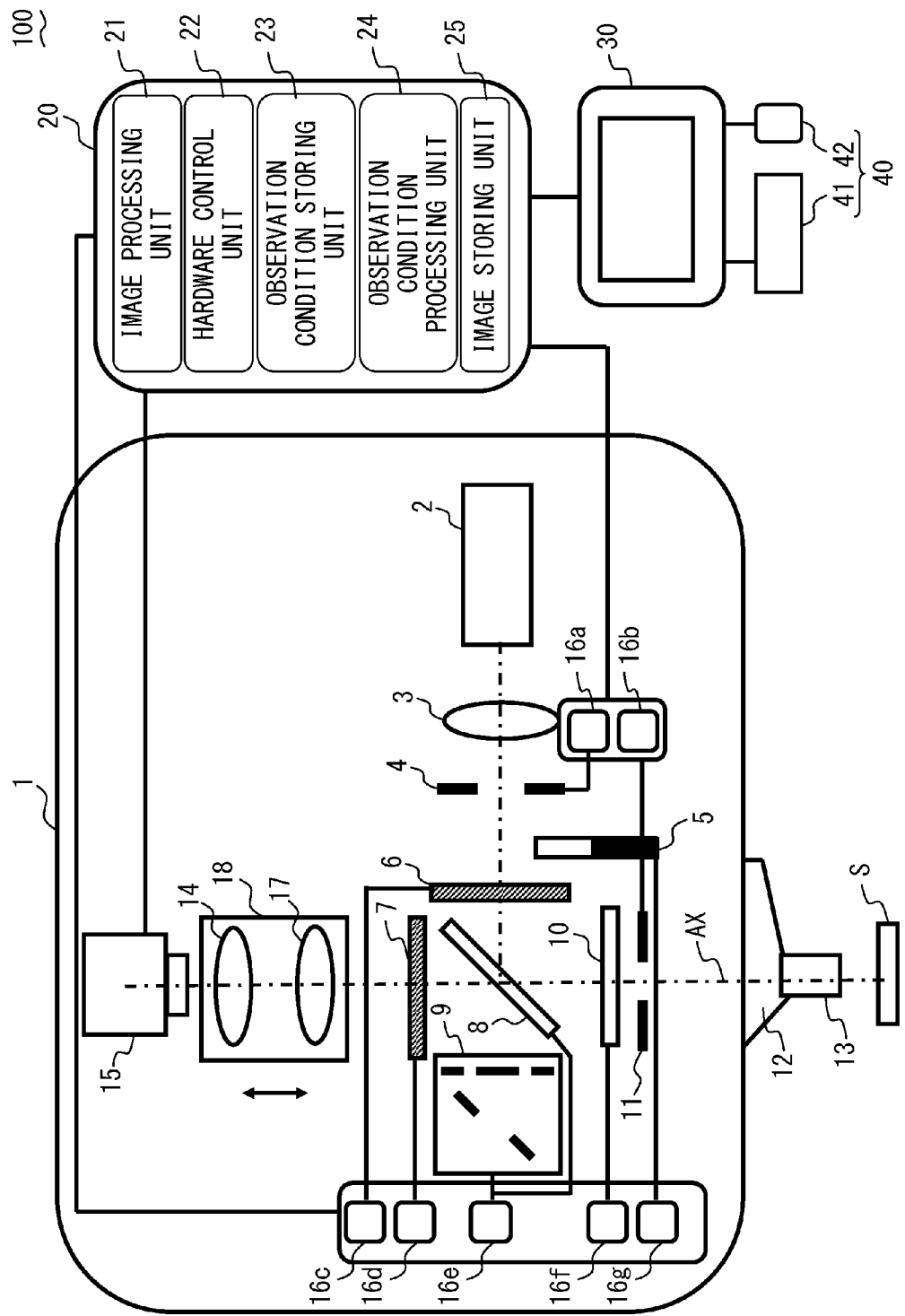
FIG. 4 illustrates a placement of the optical elements included in the magnifying observation apparatus illustrated in FIG. 1 for a differential interference observation.

As illustrated in FIG. 4, in the magnifying observation apparatus 100 that executes a differential interference microscopy, namely, a differential interference observation, of the insertion/removal members, the polarizer 6, the analyzer 7, the half mirror 8, and the DIC prism 10 are in the IN state, and the oblique observation slit 5 and the darkfield cube 9 are in the OUT state. The polarizer 6 and the analyzer 7 are adjusted to be in a mutually orthogonal state (so-called crossed Nicol state). A placement angle of the DIC prism 10 is adjusted to be an angle at which a suitable retardation occurs. The field stop 4 and the aperture stop 11 are adjusted to be a diameter suitable for the observation. With the magnifying observation apparatus 100 illustrated in FIG. 4, a stereoscopic image of the sample S can be obtained by using interference between two polarized lights that are split by the DIC prism 10 and irradiated on the sample S at slightly different positions.

Figure 5:
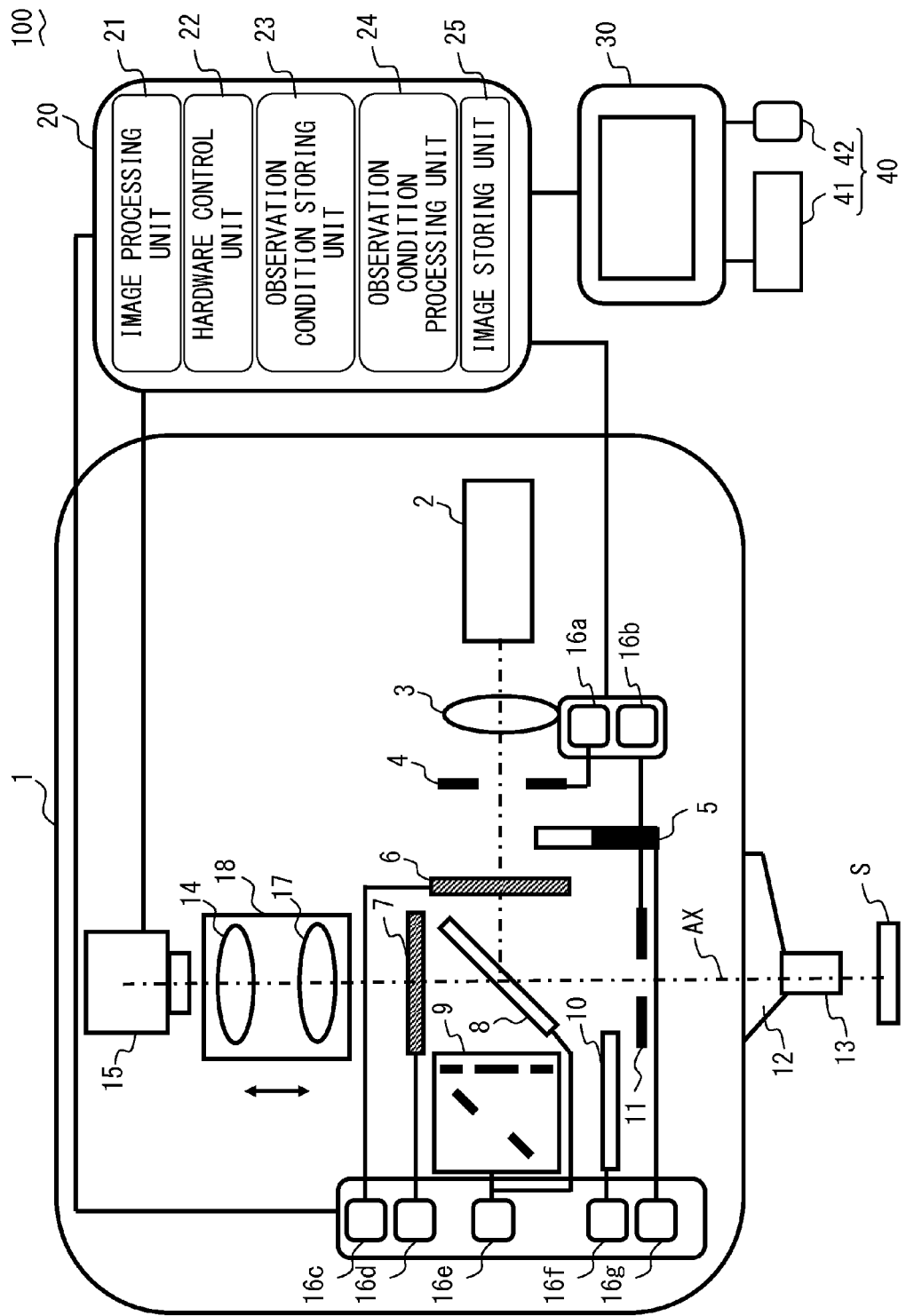
FIG. 5 illustrates a placement of the optical elements included in the magnifying observation apparatus illustrated in FIG. 1 for a polarization observation.

As illustrated in FIG. 5, in the magnifying observation apparatus 100 that executes a polarization microscopy, namely, a polarization observation, of the insertion/removal members, the polarizer 6, the analyzer 7, and the half mirror 8 are in the IN state, and the oblique observation slit 5, the darkfield cube 9 and the DIC prism 10 are in the OUT state. The polarizer 6 and the analyzer 7 are adjusted to be in a mutually orthogonal state (so-called crossed Nicol state). The field stop 4 and the aperture stop 11 are adjusted to be a diameter suitable for the observation. With the magnifying observation apparatus 100 illustrated in FIG. 5, an image having a contrast and a color according to a polarization characteristic of the sample S can be obtained.

Figure 6:
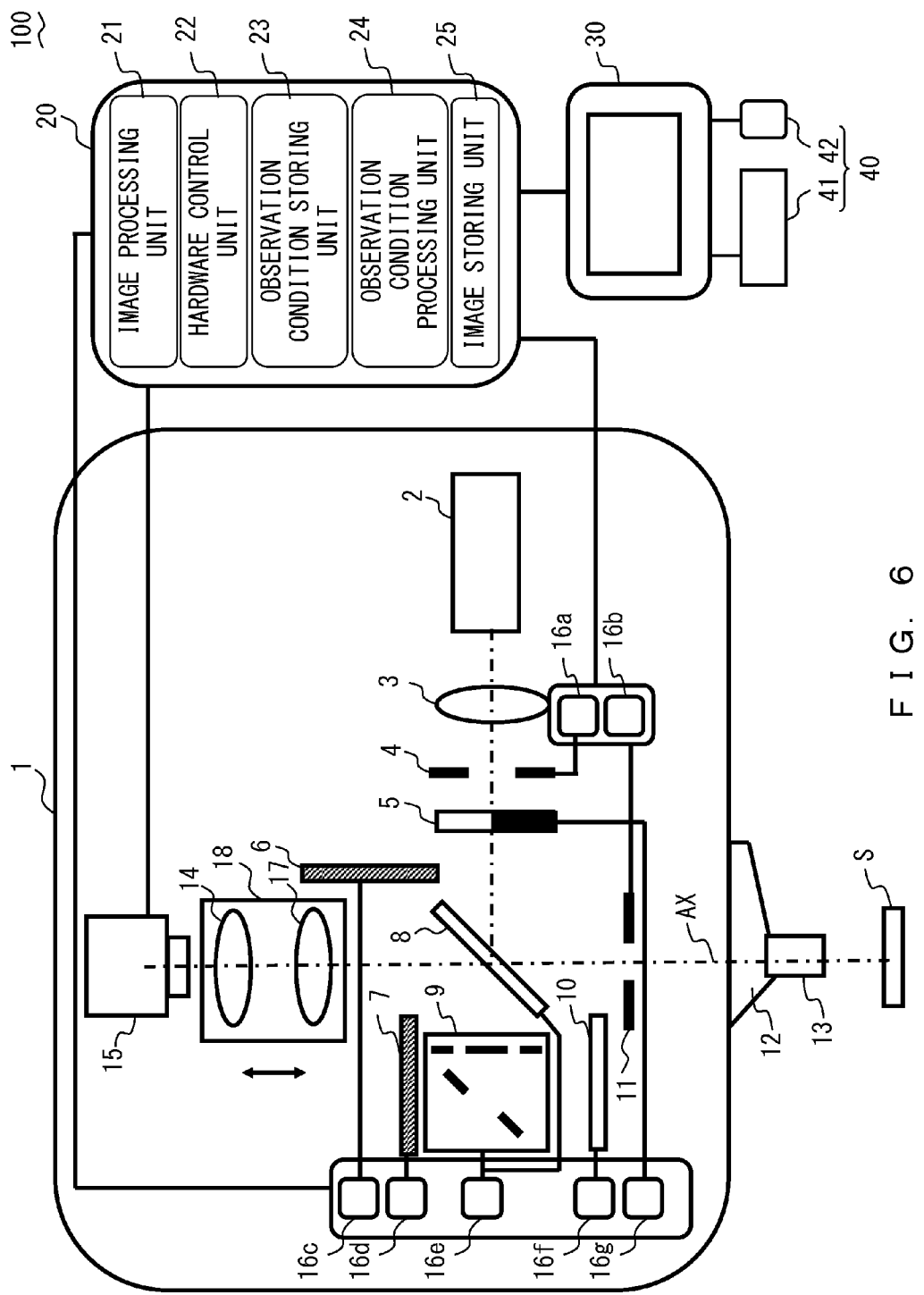
FIG. 6 illustrates a placement of the optical elements included in the magnifying observation apparatus illustrated in FIG. 1 for an oblique observation.

As illustrated in FIG. 6, in the magnifying observation apparatus 100 that executes an oblique microscopy, namely, an oblique observation, of the insertion/removal members, the oblique observation slit 5 and the half mirror 8 are in the IN state, and the polarizer 6, the analyzer 7, the darkfield cube 9 and the DIC prism 10 are in the OUT state. The field stop 4 and the aperture stop 11 are adjusted to be a diameter suitable for the observation. With the magnifying observation apparatus 100 illustrated in FIG. 6, a stereoscopic image of the sample S can be obtained because illumination light is incident only to the pupil half of the objective lens 13 and is irradiated on the sample S from only the one side.

FIG. 7 is an explanatory view of an image display method of the magnifying observation apparatus 100 according to this embodiment. As illustrated in FIG. 7, an image display area 31 for displaying a plurality of images 33 as a listing and a button 32 are displayed on a screen of the monitor 30, which is a display unit. The plurality of images 33 displayed in the image display area 31 are thumbnail images respectively generated with different microscopies.

FIG. 8 is a flowchart illustrating a process executed by the magnifying observation apparatus 100 according to this embodiment. The process executed by the magnifying observation apparatus 100 according to this embodiment is described below with reference to FIG. 8.

Once the process is started, the observation condition processing unit 24 decides a switching order for switching between the plurality of microscopies in the first step (step S101). Specifically, the observation condition processing unit 24 reads, from the observation condition storing unit 23, the number of times that each of the microscopies is used, and decides a descending order of the number of times (descending order of use frequencies) that each of the microscopies is used as the switching order. Namely, in the magnifying observation apparatus 100, the observation condition processing unit 24 functions as a switching order deciding unit.

In step S102, the hardware control unit 22 switches between the plurality of microscopies in the switching order decided by the observation condition processing unit 24. Specifically, the hardware control unit 22 switches between microscopies by reading, from the observation condition storing unit 23, information about settings such as a placement of the optical elements for a microscopy to be set next, and by driving corresponding optical elements via corresponding driving control units based on the setting information. Namely, in the magnifying observation apparatus 100, the hardware control unit 22, or the hardware control unit 22 and the driving control units and the optical elements function as a switching unit for switching between the plurality of microscopies.

In step S103, the CCD camera 15 generates an original image by capturing the image of the sample S. Moreover, the image processing unit 21 converts the original image into a thumbnail image to be displayed on the monitor 30, and outputs the thumbnail image to the image storing unit 25. Namely, in the magnifying observation apparatus 100, the CCD camera 15 and the image processing unit 21 function as an image generating unit for generating an image of a sample by capturing the image of the sample with each of the plurality of microscopies switched by the switching unit.

In step S104, the image storing unit 25 stores the image generated by the CCD camera 15 and the image processing unit 21.

In step S105, the monitor 30 that is the display unit displays the image that has been generated by the image generating unit (the CCD camera 15 and the image processing unit 21) and stored in the image storing unit 25. Specifically, the monitor 30 updates the display of the monitor 30 each time a new image is generated by the image generating unit and stored in the image storing unit 25. More specifically, the monitor 30 displays images generated by the image generating unit as a listing by adding a new image to the screen (the image display area 31 illustrated in FIG. 7) of the monitor 30 as a thumbnail image each time the new image is generated by the image generating unit and stored in the image storing unit 25.

In step S106, it is determined whether or not all the microscopies to be switched in the switching order decided in step S101 have been (sequentially) switched. If all the microscopies have been switched, the process is terminated. If not all the microscopies have been switched yet, the process returns to step S102.

By repeating the above described process, the plurality of images 33 obtained with the different microscopies are displayed as a listing in the image display area 31 of the monitor 30 that is a display unit, as illustrated in FIG. 7.

With the magnifying observation apparatus 100 and its image display method according to this embodiment, images of a sample obtained with a plurality of microscopies are automatically displayed on the monitor 30. Accordingly, a user can easily determine an optimal microscopy by making a comparison between the plurality of displayed images.

Additionally, with the magnifying observation apparatus 100 and its image display method according to this embodiment, microscopies are automatically switched in a descending order of microscopy use frequency, and an image obtained with a microscopy with a higher use frequency is displayed with a higher priority. Normally, there is a great possibility that a microscopy with a higher use frequency will be a desired microscopy. Therefore, images are displayed in such an order, whereby a user can determine an optimal microscopy in a shorter time.

Furthermore, FIG. 8 illustrates an example of the switching unit switching between the plurality of microscopies. However, the switching unit according to this embodiment may be configured to switch a plurality of observation conditions, including a plurality of microscopies. For example, the switching unit may sequentially switch a combination of a plurality of microscopies and settings of a plurality of zoom magnifications, and the CCD camera 15 and the image processing unit 21 may generate an image of a sample by capturing an image of the sample under the respective observation conditions switched by the switching unit. Moreover, the image processing unit 21 may execute a plurality of image processes for original images obtained respectively with the plurality of microscopies or observation conditions, or may generate, from one original image, a plurality of thumbnail images generated by executing different image processes.

As a result, images obtained with the plurality of microscopies under various observation conditions are displayed on the monitor 30, whereby a user can easily determine optimal observation conditions, including a microscopy.

Furthermore, FIGS. 1 to 6 illustrate the magnifying observation apparatus that can use a brightfield observation, a darkfield observation, a differential interference observation, a polarization observation, and an oblique observation as a plurality of microscopies by switching between them. However, microscopies that the magnifying observation apparatus can switch and use are not limited to these ones. For example, an observation implemented by combining a brightfield observation and a darkfield observation may be available.

A configuration of a modification example of the magnifying observation apparatus 100 according to the first embodiment, which can switch between a plurality of microscopies including an observation implemented by combining a brightfield observation and a darkfield observation in addition to a brightfield observation, a darkfield observation, a differential interference observation, a polarization observation and an oblique observation is described below with reference to FIGS. 9 to 11.

Figure 9:
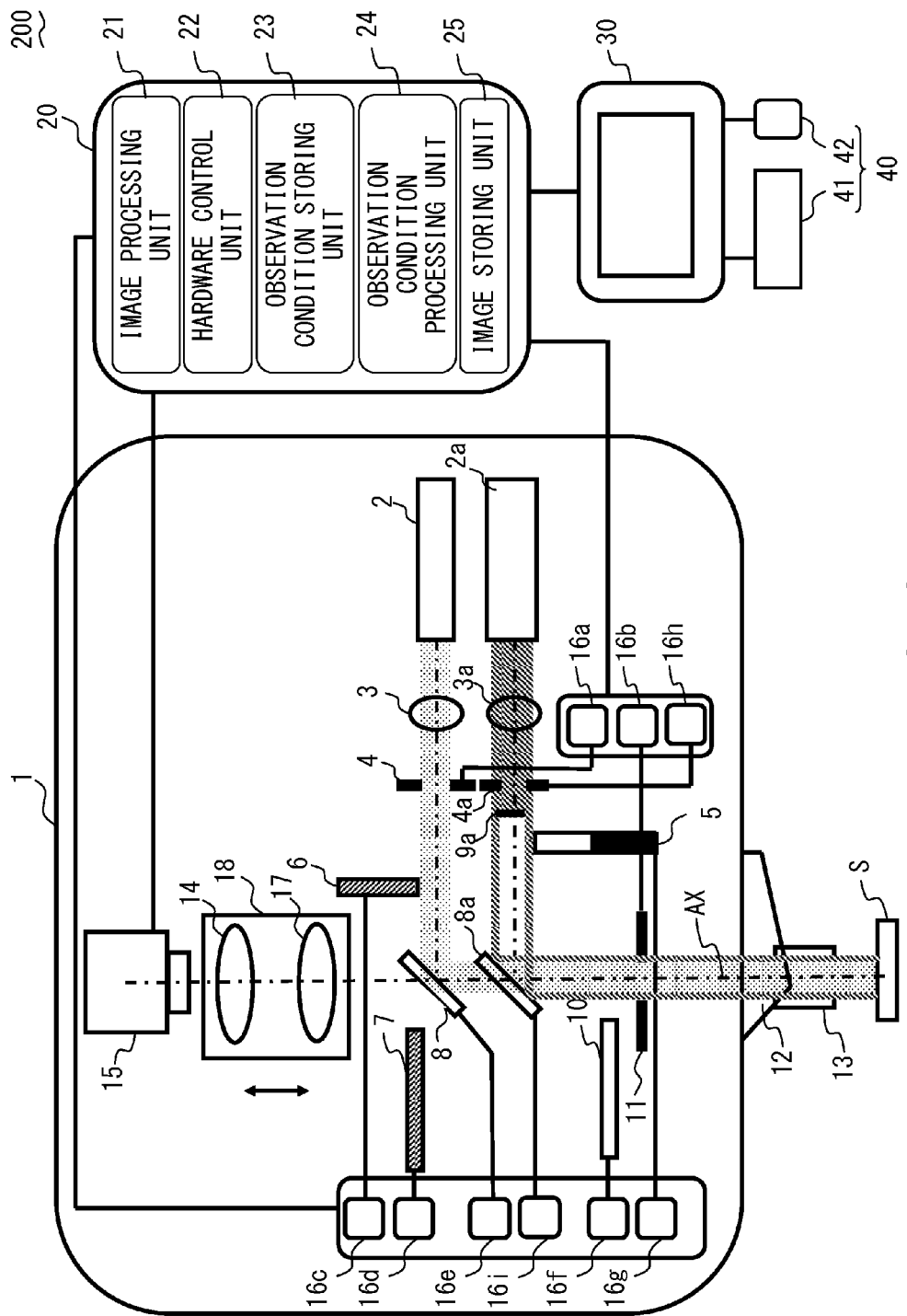
FIG. 9 illustrates another configuration of the magnifying observation apparatus according to the first embodiment, and also illustrates a placement of optical elements for an observation implemented by combining a brightfield observation and a darkfield observation.

FIG. 9 illustrates another configuration of the magnifying observation apparatus according to this embodiment. This figure illustrates a placement of optical elements used in the observation implemented by combining the brightfield observation and the darkfield observation. The magnifying observation apparatus 200 illustrated in FIG. 9 is different from the magnifying observation apparatus 100 illustrated in FIG. 1 in that a light source 2a, an illumination lens 3a, a field stop 4a, a half mirror 8a, and a light shielding plate 9a, which are intended for the darkfield observation, are included as a replacement for the darkfield cube 9. The magnifying observation apparatus 200 is different from the magnifying observation apparatus 100 illustrated in FIG. 1 also in that a diameter control unit 16h for adjusting an aperture diameter of the field stop 4a by driving the field stop 4a and an insertion/removal control unit 16i for driving the half mirror 8a to insert/remove it in/from the optical path are included. The other components are similar to those of the magnifying observation apparatus 100 illustrated in FIG. 1.

In the magnifying observation apparatus 200 illustrated in FIG. 9, illumination light that is emitted from the light source 2 and reflected by the half mirror 8 passes through a central portion (a brightfield optical path) of the objective lens 13 that can observe both the bright field and the dark field and illuminates a sample, and at the same time, illumination light that is emitted from the light source 2a and reflected by the half mirror 8a passes through a peripheral portion (darkfield optical path) of the objective lens 13 and can illuminate the sample obliquely. As a result, the observation implemented by combining the brightfield observation and the darkfield observation can be performed.

Accordingly, with the magnifying observation apparatus 200, the plurality of microscopies including the brightfield observation, the darkfield observation, the differential interference observation, the polarization observation, the oblique observation, the fluorescent observation, and the observation implemented by combining the brightfield observation and the darkfield observation can be switched and used.

Figure 10:
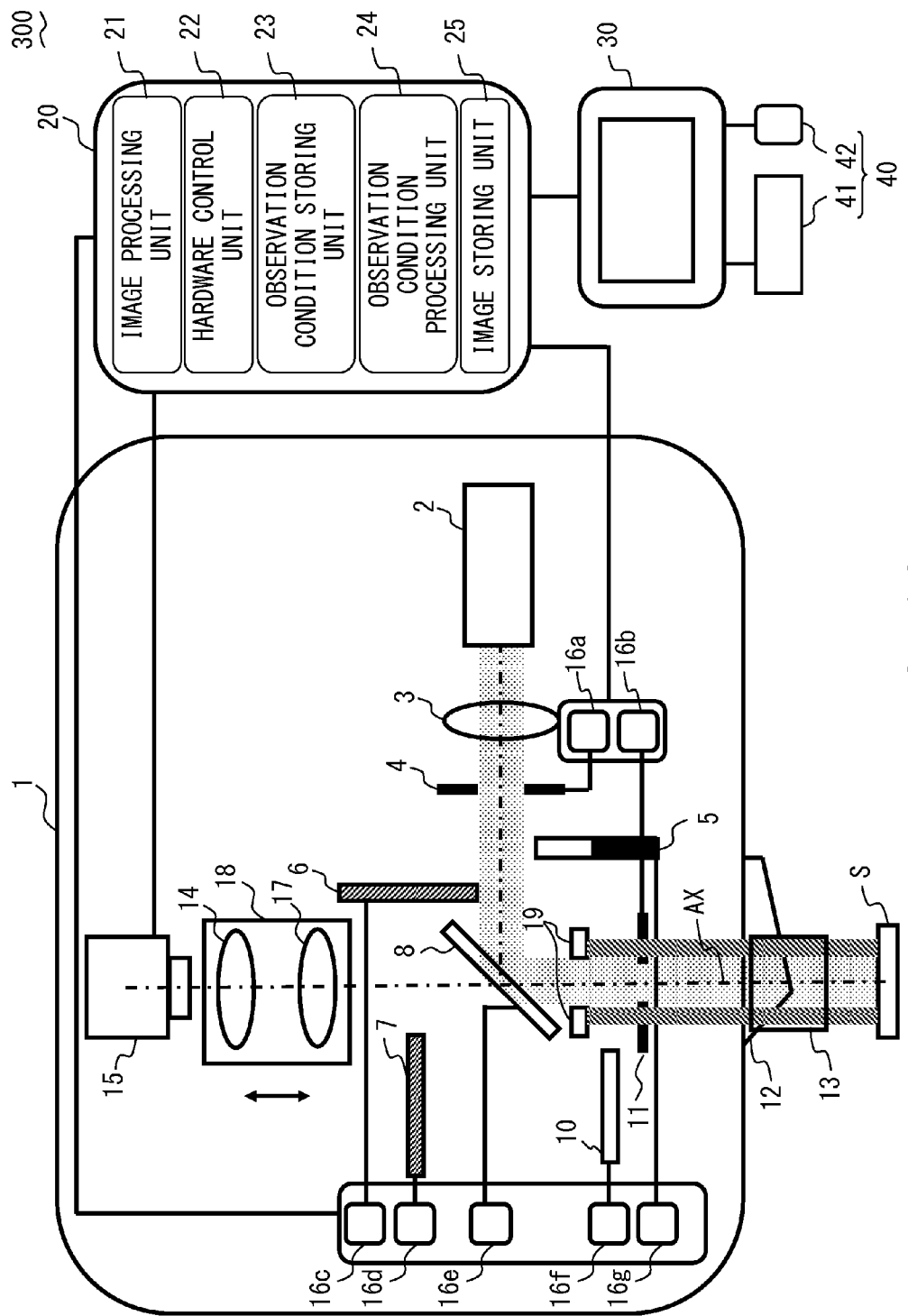
FIG. 10 illustrates a further configuration of the magnifying observation apparatus according to the first embodiment, and also illustrates a placement of optical elements for an observation implemented by combining a brightfield observation and a darkfield observation.

FIG. 10 illustrates a further configuration of the magnifying observation apparatus according to this embodiment. This figure illustrates a placement of optical elements used for an observation implemented by combining a brightfield observation and a darkfield observation. FIG. 11 is a top view of a ring illumination light source illustrated in FIG. 10. The magnifying observation apparatus 300 illustrated in FIG. 10 is different from the magnifying observation apparatus 100 illustrated in FIG. 1 in that the ring illumination light source 19 arranged between the objective lens 13 and the half mirror 8 is included as a replacement for the darkfield cube 9. The other components are similar to those of the magnifying observation apparatus 100 illustrated in FIG. 1.

Figure 11:
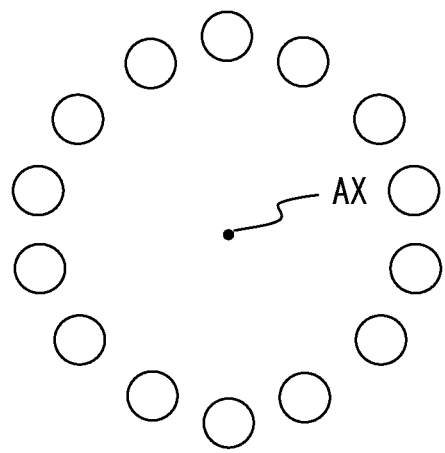
FIG. 11 is a top view of a ring illumination light source illustrated in FIG. 10.

In the magnifying observation apparatus 300 illustrated in FIG. 10, illumination light that is emitted from the light source 2 and reflected by the half mirror 8 passes through a central portion (brightfield optical path) of the objective lens 13 that can observe both the bright field and the dark field and illuminates the sample, and at the same time, illumination light that is emitted from the ring illumination light source 19 composed of a plurality of light sources arranged in the form of a ring around an optical axis AX as illustrated in FIG. 11 passes through a peripheral portion (darkfield optical path) of the objective lens 13 and can illuminate the sample obliquely. As a result, the observation implemented by combining the brightfield observation and the darkfield observation can be performed.

Accordingly, with the magnifying observation apparatus 300, the plurality of microscopies including the brightfield observation, the darkfield observation, the differential interference observation, a polarization observation, the oblique observation, the fluorescent observation, and the observation implemented by combining the brightfield observation and the darkfield observation can be switched and used similarly to the magnifying observation apparatus 200.

<Second Embodiment>

A magnifying observation apparatus according to this embodiment is a magnifying observation apparatus that enables a user to determine an optimal microscopy and an optimal observation condition by displaying images of a sample which are captured respectively with a plurality of microscopies and that optimally adjusts an observation condition by switching between the plurality of microscopies. A configuration of the magnifying observation apparatus according to this embodiment is similar to that of the magnifying observation apparatus 100 according to the first embodiment.

The magnifying observation apparatus according to this embodiment has a live observation mode and an observation condition setting mode as operation modes. The live observation mode is an operation mode for observing a sample S, whereas the observation condition setting mode is an operation mode for setting observation conditions.

A display of the monitor 30 of the magnifying observation apparatus according to this embodiment in the observation condition setting mode is similar to that of the monitor 30 of the magnifying observation apparatus according to the first embodiment illustrated in FIG. 7. Namely, in the observation condition setting mode, on the monitor 30 that is a display unit, a screen including an image display area 31 for displaying a plurality of images 33 as a listing and a button 32 is displayed. The plurality of images 33 displayed in the image display area 31 are thumbnail images generated respectively with different microscopies.

Note that, in the observation condition setting mode, a user can select a desired image from among the images 33 displayed on the monitor 30 (in the image display area 31) by using the keyboard 41 or the mouse 42, which are selecting units.

By selecting an image and pressing the button 32, the current microscopy is switched to a microscopy (hereinafter referred to as a microscopy of a selected image) used when the selected image is generated, and the operation mode transfers to the live observation mode. In the live observation mode, a live image of the sample S is displayed on the monitor 30.

FIG. 12 is a flowchart illustrating a process executed in the observation condition setting mode of the magnifying observation apparatus according to this embodiment. The process executed in the observation condition setting mode of the magnifying observation apparatus according to this embodiment is described below with reference to FIG. 12. The same processes as those executed by the magnifying observation apparatus 100 according to the first embodiment illustrated in FIG. 8 are denoted with the same reference numerals, and their explanations are omitted.

Once the process of the observation condition setting mode is started, the observation condition processing unit 24 decides a switching order for switching between a plurality of microscopies in the first step (step S101). Processes in steps S101 to S105 are the same as those described above with reference to FIG. 8.

After images are displayed, it is determined whether or not a user has selected one image from among the images displayed as a listing on the monitor 30 in step S107. Specifically, it is determined whether or not the user has pressed the button 32 after selecting one image with the keyboard 41 or the mouse 42 from among the plurality of images displayed as a listing. If the user has selected no image, the process returns to step S106. If the user has selected one image, the process proceeds to step S108.

In step S106, it is determined whether or not all the microscopies have been (sequentially) switched in the switching order decided in step S101. If all the microscopies have been switched, the process proceeds to step S107. Alternatively, if not all the microscopies have been switched yet, the process returns to step S102.

In step S108, the switching unit stops switching the microscopies sequentially in the switching order decided by the observation condition processing unit 24 in step S101, and switches the current microscopy to a microscopy of the selected image selected by the user.

In step S109, the number of times that any of the microscopies is used, which is stored in the observation condition storing unit 23, is updated. Specifically, the number of times that the microscopy after being switched in step S108 is used is incremented by 1.

Upon termination of the process in step S109, the observation condition setting mode is exited, and the live observation mode is entered into in the microscopy after being switched in step S108.

In the observation condition setting mode according to this embodiment, it is determined whether or not a user has selected an image after updating a display of the monitor 30 each time a new image is generated by the image generating unit. Accordingly, when selecting an image, the user does not need to wait until all images are displayed as a listing after all the microscopies have been sequentially switched in the switching order decided by the observation condition processing unit 24.

Additionally, in the observation condition setting mode according to this embodiment, microscopies are switched in a descending order of use frequencies of the microscopies, and an image obtained with a microscopy having a higher use frequency is displayed with a higher priority. Normally, there is a great possibility that a microscopy having a higher use frequency will be a desired microscopy. Therefore, images are displayed in such an order, whereby the length of time that a user needs to select his or her desired image can be reduced.

Accordingly, with the magnifying observation apparatus according to this embodiment, a desired microscopy can be identified at an early stage, and can be switched. Therefore, an observation condition can be optimally adjusted in a short time.

Additionally, in the observation condition setting mode according to this embodiment, a switch can be made to a desired microscopy only by selecting a displayed image.

Moreover, images respectively obtained with different microscopies are displayed as a listing. Therefore, a comparison can be easily made between the images, and a desired microscopy can be easily identified. This point is similar to that implemented by the magnifying observation apparatus according to the first embodiment.

Accordingly, with the magnifying observation apparatus according to this embodiment, an observation condition can be optimally adjusted with ease if a user does not have expertise in the magnifying observation apparatus.

An example where the observation condition processing unit 24 decides the descending order of use frequencies of microscopies as a switching order of the microscopies is provided above. However, the switching order decided by the observation condition processing unit 24 is not limited to the descending order of use frequencies of microscopies. The observation condition processing unit 24 may decide, for example, an order different for each sample type or a descending order of use frequencies of microscopies for each sample type as the switching order of microscopies. Alternatively, the observation condition processing unit 24 may decide, for example, an order different for each user or a descending order of use frequencies of microscopies for each user as the switching order of microscopies. Further alternatively, the observation condition processing unit 24 may decide a switching order manually set by a user as the switching order of microscopies.

<Third Embodiment>

A magnifying observation apparatus according to this embodiment is a magnifying observation apparatus for optimally adjusting observation conditions by switching a plurality of microscopies, and is different from the magnifying observation apparatus according to the second embodiment in that a user can select a plurality of images in the observation condition setting mode. A configuration of the magnifying observation apparatus according to this embodiment is similar to that of the magnifying observation apparatus according to the second embodiment, and also a configuration of the screen displayed on the monitor in the observation condition setting mode of the magnifying observation apparatus according to this embodiment is similar to that of the screen illustrated in FIG. 7. Accordingly, the same components are denoted with the same reference numerals.

FIG. 13 is a flowchart illustrating a process executed in an observation condition setting mode of the magnifying observation apparatus according to this embodiment. A process executed in the observation condition setting mode of the magnifying observation apparatus according to this embodiment is described mainly by referring to differences from the process executed in the observation condition setting mode of the magnifying observation apparatus according to the second embodiment illustrated in FIG. 12.

Processes in steps S101 to S109 are similar to those executed by the magnifying observation apparatus according to the second embodiment. However, if it is determined that an image or images have been selected in step S107, the process proceeds to step S201.

In step S201, it is determined whether or not the number of images selected by the user is one. With the magnifying observation apparatus according to this embodiment, a user can select a plurality of images as selected images. Specifically, a plurality of images can be selected as selected images by pressing the button 32 after putting the plurality of images 33 displayed as a listing in the image display area 31 illustrated in FIG. 7 into a selected state.

If it is determined that one image has been selected as a selected image in step S201, the process proceeds to step S108. Thereafter, processes similar to those executed by the magnifying observation apparatus according to the second embodiment are executed in steps S108 and S109. Then, the observation condition setting mode is exited, and the live observation mode is entered into.

If it is determined that a plurality of images have been selected as selected images in step S201, the process proceeds to step S202.

In step S202, the switching unit stops switching the microscopies sequentially in the switching order decided by the observation condition processing unit 24 in step S101, and switches the current microscopy to a microscopy of the selected image initially selected by the user.

In step S203, the number of times that any of the microscopies is used, which is stored in the observation condition storing unit 23, is updated. Specifically, the number of times that the microscopy after being switched in step S202 is used is incremented by 1.

Upon termination of the process in step S203, the observation condition setting mode is exited, and a live observation mode is entered into in the microscopy after being switched in step S202.

Figure 14:
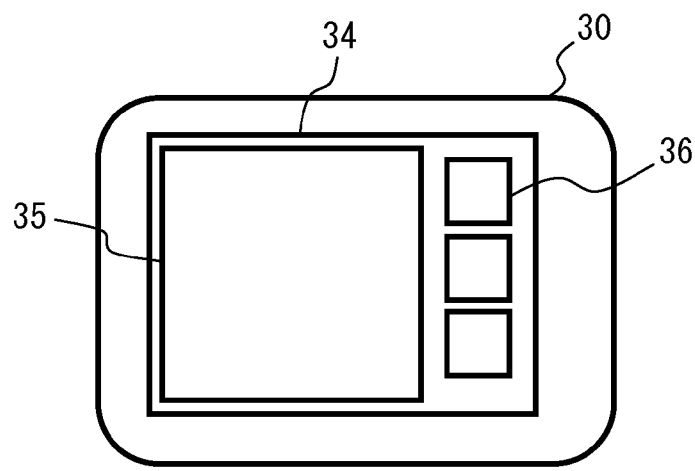
FIG. 14 is an explanatory view of a live observation mode of the magnifying observation apparatus according to the third embodiment.

FIG. 14 is an explanatory view of the live observation mode of the magnifying observation apparatus according to this embodiment. As illustrated in FIG. 14, in the live observation mode, a plurality of selected images 36 selected in the observation condition setting mode are displayed along with a live image 35 in an image display area 34 of the monitor 30 that is a display unit. The selected images 36 are still thumbnail images. If the number of selected images is one, there is no need to display a thumbnail image (selected image). Therefore, the live image is displayed in the entire image display area 34.

In the live observation mode, a user selects a desired image from among the selected images 36 displayed on the monitor 30 (in the image display area 34) that is the display unit, so that the current microscopy is switched to a microscopy of the selected image selected in the live observation mode. Namely, a plurality of images are selected as selected images in the observation condition setting mode, so that a plurality of microscopies can be switched without repeatedly entering into the observation condition setting mode. Note that the number of times of use of the microscopy after being switched, which is stored in the observation condition storing unit 23, is incremented by 1 after the microscopy is switched.

Accordingly, with the magnifying observation apparatus according to this embodiment, an observation condition during an observation can also be changed in a short time, in addition to the effect that an observation condition can be optimally adjusted with ease in a short time similarly to the magnifying observation apparatus according to the second embodiment. Therefore, the magnifying observation apparatus according to this embodiment is particularly preferable, for example, in a case where there are a plurality of microscopies suitable for an observation of a sample.

An example where the switching unit switches the current microscopy to a microscopy of a selected image that a user has initially selected when selecting a plurality of images as selected images is provided above. However, the microscopy switching is not particularly limited to this one. The switching unit switches the current microscopy to, for example, a microscopy having the highest use frequency among microscopies of selected images.

<Fourth Embodiment>

A magnifying observation apparatus according to this embodiment is different from that according to the second embodiment in that an observation condition can be optimally adjusted by switching between a plurality of detailed settings of each microscopy in addition to a switch made between a plurality of microscopies. A configuration of the magnifying observation apparatus according to this embodiment is similar to that of the magnifying observation apparatus according to the second embodiment, and also a configuration of a screen displayed on the monitor in an observation condition setting mode of the magnifying observation apparatus according to this embodiment is similar to that of the screen illustrated in FIG. 7. Therefore, the same components are denoted with the same reference numerals.

Here, the detailed settings of a microscopy are settings of the magnifying observation apparatus excluding, of the observation conditions, a microscopy. More specifically, the detailed settings include settings common to all microscopies, such as diameters of the field stop 4 and the aperture stop 11, the output (brightness level) of the light source 2, an exposure time of the CCD camera 15, and the like, in addition to settings dedicated to a microscopy, such as a feed amount (retardation amount) of the DIC prism 10 in a differential interference observation. For example, if the feed amount is changed by moving the DIC prism 10, an image of a different hue can be obtained.

Figure 15:
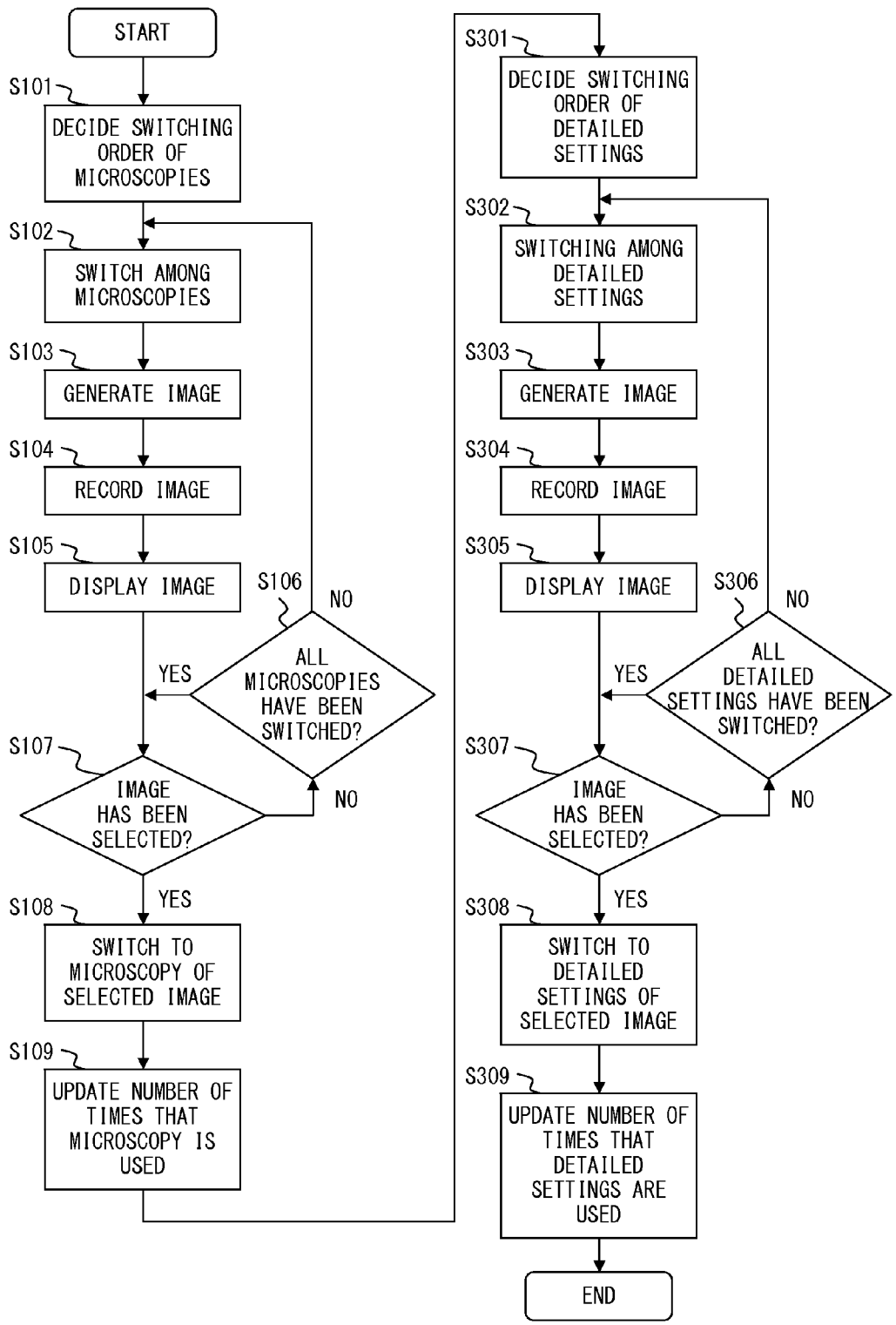
FIG. 15 is a flowchart illustrating a process executed in an observation condition setting mode of a magnifying observation apparatus according to a fourth embodiment.

FIG. 15 is a flowchart illustrating a process executed in the observation condition setting mode of the magnifying observation apparatus according to this embodiment. The process executed in the observation condition setting mode of the magnifying observation apparatus according to this embodiment is described mainly by referring to differences from the process executed in the observation condition setting mode of the magnifying observation apparatus according to the second embodiment illustrated in FIG. 12.

Processes in steps S101 to S109 are similar to those executed by the magnifying observation apparatus according to the second embodiment. However, the process proceeds to step S301 after step S109 is terminated.

In step S301, the observation condition processing unit 24 decides a switching order for switching between detailed settings of the microscopy after being switched in step S108. Specifically, the observation condition storing unit 23 stores the number of times that detailed settings of each microscopy are used, and the observation condition processing unit 24 reads, from the observation condition storing unit 23, the number of times that the detailed settings of each microscopy are used, and decides a descending order of the number of times (descending order of use frequencies) that the detailed settings are used as a switching order.

In steps S302 to S309, processes similar to those in steps S102 to S109 are executed except that the detailed settings are switched in the switching order of the detailed settings, which was decided in step S301, as a replacement for the switching order of microscopies, which was decided in step S101.

Upon termination of the process in step S309, the observation condition setting mode is exited, and a live observation mode is entered into in the microscopy after being switched in step S108, and with the detailed settings after being switched in step S308.

In the observation condition setting mode according to this embodiment, a desired microscopy is selected by using a plurality of images respectively obtained with different microscopies, and desired detailed settings can be selected by using the plurality of images respectively obtained under different detailed settings of the selected microscopy.

Accordingly, with the magnifying observation apparatus according to this embodiment, observation conditions can be adjusted more optimally in comparison with the magnifying observation apparatus according to the second embodiment, in addition to the effect that the observation conditions can be easily adjusted in a short time, similarly to the magnifying observation apparatus according to the second embodiment.

An example where the user selects one image as a selected image is provided above. However, a user may select a plurality of images as selected images, as referred to in the third embodiment. For example, a user selects a plurality of images under different detailed settings as selected images, whereby the detailed settings may be switched in a short time during an observation.

<Fifth Embodiment>

A magnifying observation apparatus according to this embodiment is different from that according to the second embodiment in that observation conditions can be optimally adjusted by switching between a plurality of image processes executed for a captured original image in addition to a switch made between a plurality of microscopies. A configuration of the magnifying observation apparatus according to this embodiment is similar to that of the magnifying observation apparatus according to the second embodiment, and also a configuration of a screen displayed on the monitor in an observation condition setting mode of the magnifying observation apparatus according to this embodiment is similar to that of the screen illustrated in FIG. 7. Accordingly, the same components are denoted with the same reference numerals. The plurality of image processes include at least one of an HDR process, a halation removal process, a particular color enhancement process, and an edge enhancement process.

Figure 16:
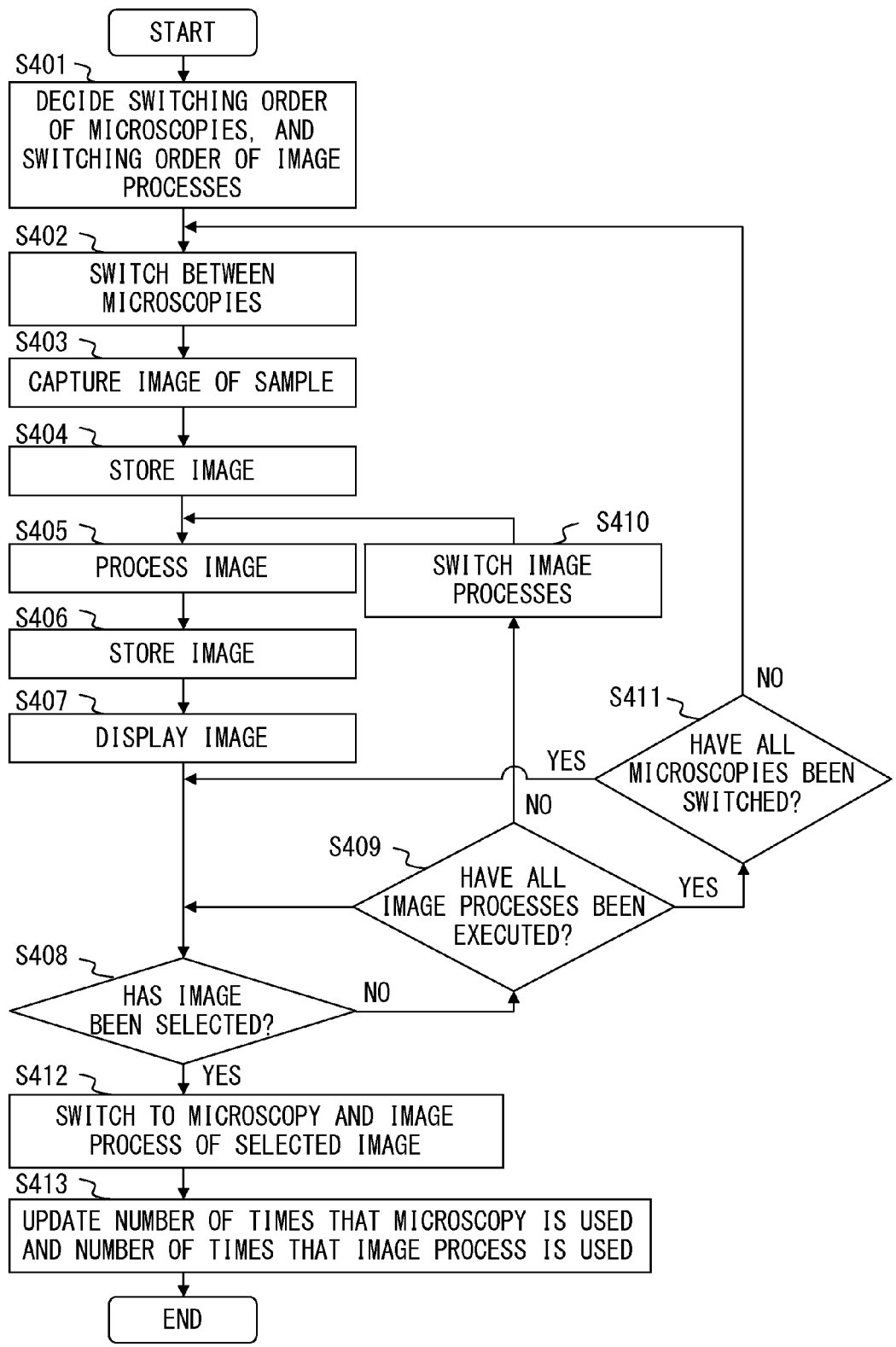
FIG. 16 is a flowchart illustrating a process executed in an observation condition setting mode of a magnifying observation apparatus according to a fifth embodiment.

FIG. 16 is a flowchart illustrating a process executed in the observation condition setting mode of the magnifying observation apparatus according to this embodiment. The process executed in the observation condition setting mode of the magnifying observation apparatus according to this embodiment is described in detail.

Once the observation condition setting mode is entered into, the observation condition processing unit 24 decides a switching order for switching between a plurality of microscopies, and a switching order for switching between a plurality of image processes in the first step (step S401). Specifically, the observation condition storing unit 23 stores the number of times that each of the microscopies is used, and the number of times that each of the image processes is used. The observation condition processing unit 24 reads, from the observation condition storing unit 23, the number of times that each of the microscopies is used, and decides a descending order (descending order of use frequencies) of the number of times that each of the plurality of microscopies is used as a switching order of the microscopies. The observation processing unit also reads, from the observation condition storing unit 23, the number of times that each of the image processes is used, and also decides a descending order (descending order of use frequencies) of the number of times that each of the plurality of image processes is used as a switching order of the image processes.

In step S402, the hardware control unit 22 switches between the plurality of microscopies in the switching order of the microscopies, which has been decided by the observation condition processing unit 24.

In step S403, the CCD camera 15 generates an original image by capturing the image of a sample S. In step S404, the image storing unit 25 stores the original image generated by the CCD camera 15.

In step S405, the image processing unit 21 generates from the original image an image for which the image process has been executed, by executing the image process in the switching order of the image processes, which has been decided by the observation condition processing unit 24. Moreover, the image processing unit 21 converts the image for which the image processes have been executed into a thumbnail image to be displayed on the monitor 30, and outputs the thumbnail image to the image storing unit 25.

In step S406, the image storing unit 25 stores the image output from the image processing unit 21.

In step S407, the monitor 30 displays the image stored in the image storing unit 25. Specifically, the monitor 30 updates a display of the monitor 30 each time a new image is generated by the image generating unit and stored in the image storing unit 25. More specifically, the monitor 30 adds a new image to the screen of the monitor 30 as a thumbnail image each time the new image is generated by the image generating unit and stored in the image storing unit 25, and displays images generated by the image generating unit as a listing.

In step S408, it is determined whether or not a user has selected one image from among the images displayed as a listing on the monitor 30. If the user has selected one image, the process proceeds to step S412. If the user has selected no image, the process proceeds to step S409.

In step S409, it is determined whether or not all the image processes have been executed in the switching order decided in step S401. If all the image processes have been executed, the process proceeds to step S411. Alternatively, if all the image processes have not been executed yet, the process proceeds to step S410.

In step S410, the image storing unit 25 switches between the plurality of image processes in the switching order of the image processes, which has been decided by the observation condition processing unit 24.

In step S411, it is determined whether or not all the microscopies have been switched in the switching order decided in step S401. If all the microscopies have been switched, the process proceeds to step S408. If all the microscopies have not yet been switched, the process proceeds back to step S402.

In step S412, the switching unit stops switching between the microscopies and the image processes sequentially in the switching orders decided by the observation condition processing unit 24 in step S401, and respectively switches the current microscopy and image process to a microscopy and an image process of the selected image selected by the user.

In step S413, the number of times that each of the microscopies is used, and the number of times that any of the image processes is used, which are stored in the observation condition storing unit 23, are updated. Specifically, the number of times that the microscopy after being switched in step S412 is used, and the number of times that the image process after being switched in step S412 is used, are incremented by 1.

Upon termination of the process in step S413, the observation condition setting mode is exited, and the live observation mode is entered into in the microscopy and the image process after being switched in step S412.

In the observation condition setting mode according to this embodiment, a plurality of images respectively obtained with different microscopies and image processes are displayed as a listing. Accordingly, a desired microscopy and image process can be simultaneously selected by selecting a image only once.

Therefore, with the magnifying observation apparatus according to this embodiment, observation conditions can be more optimally adjusted in comparison with the magnifying observation apparatus according to the second embodiment, in addition to the effect that observation conditions can be easily adjusted in a short time, similarly to the magnifying observation apparatus according to the second embodiment.

An example where a user selects one image as a selected image is provided above. However, a user may select a plurality of images as selected images as referred to in the third embodiment. For example, a user selects a plurality of images respectively obtained with different microscopies and/or image processes as selected images, whereby microscopies and/or image processes can be switched in a short time during an observation.

The second to the fifth embodiments have referred to the configurations where a switch is made to a microscopy used when a desired image is obtained by selecting the desired image from among images that are obtained with a plurality of microscopies and displayed as a listing. However, a specification of a microscopy to be switched is not particularly limited to a selection of an image. A microscopy to be switched may be specified with another method.

What is claimed is:

1. A magnifying observation apparatus comprising:
   an observation condition processing unit configured to decide a first switching order for switching between a plurality of microscopies, and a second switching order for switching between a plurality of detailed settings of each of the plurality of microscopies;
   a first switching unit configured to switch between the plurality of microscopies in the first switching order decided by the observation condition processing unit;
   a second switching unit configured to switch between the plurality of detailed settings in the second switching order decided by the observation condition processing unit;
   an image generating unit configured to generate a plurality of first images of a sample by capturing an image of the sample using each of the plurality of microscopies switched by the first switching unit, and to generate a plurality of second images of the sample by capturing an image of the sample using each of the plurality of detailed settings switched by the second switching unit;
   a display unit configured to display plural images generated by the image generating unit; and
   a selecting unit configured to allow a user to select an image from among the plural images displayed by the display unit,
   wherein the display unit is configured to: (i) each time the image generating unit generates a new first image, display the new first image on a screen of the display unit, and (ii) each time the image generating unit generates a new second image, display the new second image on the screen of the display unit.

2. The magnifying observation apparatus according to claim 1, wherein the first switching unit is configured to, when an image from among the plurality of first images generated by the image generating unit is selected using the selecting unit, switch to a microscopy from among the plurality of microscopies corresponding to the selected image, and
   wherein the second switching unit is configured to, when the first switching unit switches to the microscopy corresponding to the selected image, switch between the plurality of detailed settings of the microscopy corresponding to the selected image in the second switching order.

3. The magnifying observation apparatus according to claim 2, wherein the display unit is configured to:
   each time the image generating unit generates a new first image, add the new first image to the screen of the display unit as a thumbnail image so as to display the plurality of first images generated by the image generating unit as a listing; and each time the image generating unit generates a new second image, add the new second image to the screen of the display unit as a thumbnail image so as to display the plurality of second images generated by the image generating unit as a listing.

4. The magnifying observation apparatus according to claim 3, wherein the second switching unit is configured to, when an image from among the plurality of second images generated by the image generating unit is selected using the selecting unit, switch to a detailed setting from among the plurality of detailed settings of the microscopy of the selected image.

5. The magnifying observation apparatus according to claim 4, wherein the display unit is configured to display a live image of the sample with the detailed setting of the microscopy of the selected image after the switch by the second switching unit.

6. The magnifying observation apparatus according to claim 1, wherein the plurality of detailed settings are directed to at least one of an exposure time of an image capturing element included in the image generating unit, a brightness level of a light source included in the magnifying observation apparatus, and a diameter of an aperture unit included in the magnifying observation apparatus.

7. The magnifying observation apparatus according to claim 1, wherein the image generating unit is configured to:

generate the plurality of first images by executing an image process for an original image of the sample that is obtained by capturing the image of the sample with each of the plurality of microscopies; and generate the plurality of second images by executing an image process for an original image of the sample that is obtained by capturing the image of the sample with each of the plurality of detailed settings of each of the plurality of microscopies.

8. The magnifying observation apparatus according to claim 3, wherein the image generating unit is configured to generate plural first or second images from one original image of the sample by executing different image processes.

9. The magnifying observation apparatus according to claim 1, wherein the observation condition processing unit is configured to decide the first switching order by deciding a descending order of use frequencies of the plurality of microscopies.

10. The magnifying observation apparatus according to claim 1, wherein the observation condition processing unit is configured to decide the second switching order by deciding a descending order of use frequencies of the plurality of detailed settings of each of the plurality of microscopies.

11. The magnifying observation apparatus according to claim 1, wherein the observation condition processing unit is configured to decide at least one of the first and second switching orders for each type of sample.

12. The magnifying observation apparatus according to claim 1, wherein the observation condition processing unit is configured to decide at least one of the first and second switching orders for each user.

13. The magnifying observation apparatus according to claim 1, wherein the observation condition processing unit is configured to decide a switching order manually set by the user as at least one of the first and second switching orders.

14. The magnifying observation apparatus according to claim 1, wherein the magnifying observation apparatus is settable into one of a live observation mode for observing the sample and an observation condition setting mode for setting an observation condition for observing the sample, and wherein when a desired image is selected from among the plurality of first images displayed on a listing during the observation condition setting mode: (i) the first switching unit switches to a microscopy from among the plurality of microscopies used to generate the selected desired first image, (ii) the magnifying observation apparatus transfers the operation mode to the live observation mode, and (iii) the display unit displays a live image of the sample under the switched microscopy.

15. The magnifying observation apparatus according to claim 7, wherein the image process includes at least one of an HDR process, a halation removal process, a particular color enhancement process, and an edge enhancement process, which are executed for the original image.

16. The magnifying observation apparatus according to claim 1, wherein the plurality of microscopies include a brightfield observation, a darkfield observation, a differential interference observation, a polarization observation, an oblique observation, a fluorescence observation, and an observation implemented by combining the brightfield observation and the darkfield observation.

17. A magnifying observation method comprising:

deciding a first switching order for switching between a plurality of microscopies;

switching between the plurality of microscopies in the decided first switching order;

generating a plurality of first images of a sample under the plurality of microscopies by capturing an image of the sample using each of the plurality of switched microscopies;

each time a new first image is generated, displaying the newly generated first image;

allowing a user to select an image from among the displayed plurality of first images;

when the image is selected, deciding a second switching order for switching between a plurality of detailed settings of a microscopy from among the plurality of switched microscopies corresponding to the selected image;

switching between the plurality of detailed settings in the decided second switching order;

generating a plurality of second images of the sample under the plurality of detailed settings by capturing an image of the sample using each of the plurality of switched detailed settings; and each time a new second image is generated, displaying the newly generated second image.

* * * * *